A EVERISS.

Gathering-Attachment for Sewing-Machines.

No. 6,690. Reissued Oct. 11, 1875.

Witnesses.

L. H. Laratimer.

W. J. Pratt.

Inventor.

Alfred Everiss per Crosby & Gregory

Attys.

N. PETERS, PHOTO-LITHOGRAPHER, WASHINGTON, D. C.

UNITED STATES PATENT OFFICE.

ALFRED EVERISS, OF NEW YORK, N. Y.

IMPROVEMENT IN GATHERING ATTACHMENTS FOR SEWING-MACHINES.

Specification forming part of Letters Patent No. 93,979, dated August 24, 1869; reissue No. 6,690, dated October 11, 1875; application filed September 23, 1875.

*To all whom it may concern:*

Be it known that I, ALFRED EVERISS, of the city, county, and State of New York, have invented a new and useful Gathering Attachment for Sewing-Machines; and I do hereby declare that the following is a full, clear, and exact description of the same, reference being had to the accompanying drawing, and to the letters of reference marked thereon, making a part of this specification.

This invention relates to a new and useful attachment to be applied to sewing-machines for the purpose of gathering—that is to say, crimping or drawing together in small plaits or folds—the fabric during the time it is being stitched or sewed.

The invention may be applied to any of the sewing-machines in use which have a feed working up through an opening in the cloth-plate.

The end of the ruffling-blade reciprocates against the presser-foot, and ruffles or forms plaits in a strip passing between the blade and presser, and this movable blade is connected with an arm carried by the presser-foot, whereby a strip of material for a ruffle may be ruffled by the action of the blade and between it and a presser, and the piece of fabric to which the ruffle is to be attached may be moved freely about on the cloth-plate under the presser, and a ruffle may be attached at any desired distance from the edge of a skirt or other article, which is not the case when the ruffler-blade is connected with the cloth-plate.

This invention consists in a movable ruffler-blade connected and adapted to rise and fall with a presser-foot; also, in the combination, with a ruffler supported by a presser-foot, of a movable blade adapted to bear against the presser and form folds or gathers in a strip resting between the blade and presser; also, in the combination, with a presser and movable blade carried by the presser, of a gage carried by the foot, and adapted to guide the edge of the strip to be ruffled; also, in the combination, with a plate adapted to support the material to which the ruffler is to be attached, and a feeding device to engage and move such material, of a presser-foot and a movable blade supported and carried by it, and adapted to ruffle a strip and present it on the material supported on the cloth-plate.

Figure 1:
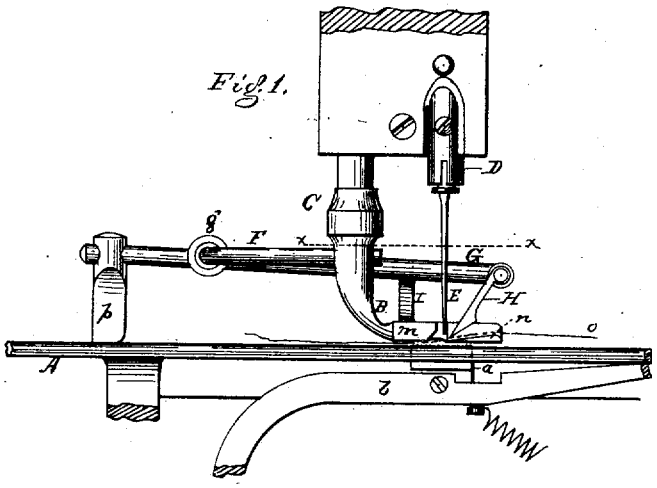
Figure 2:
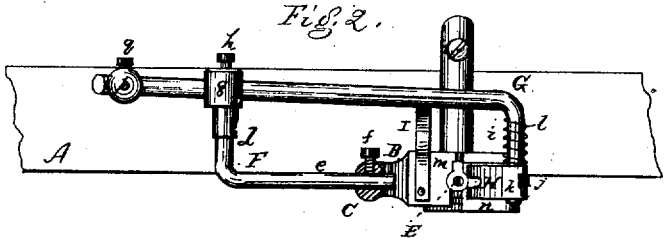

In the accompanying drawing, Figure 1 is a front view of my invention; Fig. 2, a horizontal section of the same, taken in the line *x x*, Fig. 1.

Similar letters of reference indicate corresponding parts in the two figures.

To enable those skilled in the art to fully understand and construct my invention, I will proceed to describe it.

A represents the bed-plate of a sewing-machine which has what is commonly termed a step or drop feed, the serrated or toothed plate for engaging the fabric and moving it along being designated by *a*, and carried and operated by a lever, *b*. This arrangement is the same as that used in the Howe sewing-machine; but my invention may be applied to any other machine which has a step or drop feed. B represents the presser-foot, which is secured to the lower end of a vertical rod, C, by a set-screw, said rod being allowed to rise and fall freely in its bearings, and the presser-foot is retained upon the fabric or work by a spiral spring, which is fitted upon the rod, but not shown in the drawings, as it does not form a part of my invention, and is common to many sewing-machines. D is the needle-bar, and E the needle, fitted in the lower end of the same. This needle-bar may be operated in any of the known ways. F is a rod, which is bent or curved so that one part, *d*, will be at right angles to the other part, *e*. The end of the part *e* passes through the shank of the presser-foot B, and is secured in position by a set-screw, *f*. This rod F is placed in a horizontal position, or in a plane parallel with the bed-plate A, and at the end of the part *d* of said rod there is a swivel head or hub, *g*, through which is made a hole to allow a rod, G, to pass, the rod being secured in position by a set-screw, *h*. The rod G is parallel with the part *e* of the rod F, as shown clearly in Fig. 2. On the end of the part *i* of rod G there is fitted loosely a ruffling plate or blade, H, the extent of the movement or working of which on *i* is limited by a pin, *j*, which projects from *i*, and passes through a slot, *k*, in H, as shown in Fig. 2.

This plate H has one end of a spiral spring, *l*, connected with it, and said spring has a tendency to keep the plate H in a downward position, or as near a vertical one as it is allowed to assume. The presser-foot B is composed of two parts, *m n*, the part *m* performing the usual function of holding the work down upon the serrated or toothed plate *a* while the needle is passing through the fabric, the other part, *n*, serving as a bearing or bed-piece for the fabric, the plate H acting upon the fabric resting against part *n* of the presser.

The upper surface of the part *n* is somewhat inclined from a horizontal plane, as shown clearly in Fig. 1, and the fabric *o* passes over the inclined surface of *n* and underneath the part *m*, as shown in Fig. 1. The part of the rod G which passes through the head or hub *g* of the rod F has a shifting or adjustable vertical bar, *p*, secured upon it by a set-screw, *q*, the lower end of which bar bears upon the upper surface of the bed-plate A of the sewing-machine, as shown clearly in Fig. 1. The lower end of the bar *p* serves as a fulcrum for the rod G, as will presently be seen. I is a spring, which is attached to the lower part of the presser-foot B, and bears against the under side of the rod G. This spring serves to regulate the pressure of the edge of plate H upon the fabric *o*, resting against the part *n* of the presser-foot during the descent of the latter.

The operation is as follows: The fabric being adjusted over the part *n* and under the part *m* of the presser-foot, as previously stated, and the machine operated or power applied to it, as usual, the fabric will be fed along by the action of the serrated or toothed plate *a*, the latter rising and pressing up the foot B, and moving laterally to feed the fabric along when the needle E rises above and free from the fabric. As the serrated plate *a* ascends it raises the foot B against the pressure of a spiral spring upon the rod C of said presser-foot, the plate H being kept in contact with the fabric *o* on the upper inclined part *n* of the presser-foot by a small spring. The rod F acts on rod G as the presser is lifted by the feed, and, engaging rod G near the fulcrum-bar *p*, lifts that end of rod G, carrying the plate H a greater distance than the presser is lifted, and the plate, under the action of its spring, is thrown toward the toe of the presser. Now, as the feed descends the presser follows, and, in descending, the rod or lever G, pivoted on rod F of the presser, is acted upon, so as to move the plate quickly along the presser, and the plate presents the fold made by it in the fabric to the needle, the latter descending through the fold and through the notch in the plate. The crimp or gather in the fabric is shown in Fig. 1, the fold being made directly under the needle, so that when the latter descends it will pass through the fold. The lateral movement of the serrated or feed plate *a* takes place immediately after the termination of its upward movement, and said lateral or feed movement ceases just previous to the descending movement of the plate *a* and the presser-foot, and as the fabric *o*, during this descending movement, is held between the part *m* of the presser-foot and the feed-plate *a*, and the plate H, in descending, moves inward or toward the part *m* of the presser-foot, over the inclined surface of the part *n* of said foot, the fabric is consequently gathered or crimped one fold or plate at each descent of the presser-foot. The plate H rises, of course, with the presser-foot, as the rod F is connected to it, and the plate H may have the length of its movement varied, increased, or diminished by shifting the position of the bar *p* on the rod G. The nearer said bar is adjusted to the head or hub *g* of the part *d* of the rod F, the greater length of movement the plate H will have. This varying of the movement of the plate H admits of the folds or plaits comprising the gathers being made of greater or less width, as desired.

The operation of this gathering attachment, it will be seen, is automatic and positive. No manipulation or assistance is required from the operator, so far as forming the folds or plaits is concerned, and hence the gathering of the fabric may be done by any one who can operate a machine for plain stitching.

The device may be readily applied to and detached from the machine, and constructed at a small cost, so as to be within the reach of all using a sewing-machine.

To attach the ruffled strip to another piece of fabric, pass the fabric to which the ruffled strip is to be attached under both the parts *m n* of the foot, or between the entire foot and the cloth-plate A, and the ruffled piece may be applied at any distance from the edge of the material resting on the cloth-support A, which would not be the case were the ruffler connected with the cloth-plate instead of with the presser.

I am aware a separator-plate has been connected with a presser; but with such an arrangement the strip to be ruffled is always next the cloth-plate, whereas in my invention the ruffled strip is uppermost, and may be applied at any distance from the edge of another fabric.

I claim—

1. The combination, with a presser-foot, of a movable ruffle-forming blade, connected to and adapted to rise and fall with the presser-foot.

2. The combination, with a presser-foot, of a movable ruffle-forming blade, adapted to bear against the presser and form folds or gathers in a strip resting between the blade and presser.

3. The combination of the presser with a movable ruffle-forming blade and gage, connected and adapted to rise and fall with the presser, the gage guiding the edge of the strip being ruffled, and acted on by the moving blade, and resting between its edge and the presser.

4. A presser-foot and movable ruffle-forming blade carried by it, in combination with a cloth-support and feed, adapted to sustain a fabric to which a ruffled strip is to be secured, and to engage and feed the material with its connected ruffle, substantially as described.

5. A gathering attachment, substantially as described, connected with and operated through the movement of the presser, as and for the purpose set forth.

6. The combination, with a projection carried by the presser-foot, of a lever pivoted thereto, and with a movable blade carried by the lever, and adapted to operate against the presser.

ALFRED EVERISS.

Witnesses:
G. W. GREGORY,
S. B. KIDDER.